United States Patent [19]
Muench, Jr.

[11] Patent Number: 5,007,377
[45] Date of Patent: Apr. 16, 1991

[54] APPARATUS AND METHOD FOR MARINE HABITAT DEVELOPMENT

[76] Inventor: August A. Muench, Jr., 3031 SW. Manatee Ave., Ruskin, Fla. 33570

[21] Appl. No.: 475,912

[22] Filed: Feb. 6, 1990

[51] Int. Cl.⁵ ............................................. A01K 61/00
[52] U.S. Cl. ..................................... 119/4; 119/2
[58] Field of Search ................................. 119/2, 3, 4

[56] References Cited

U.S. PATENT DOCUMENTS

| | | | |
|---|---|---|---|
| 3,316,881 | 5/1967 | Fischer | 119/4 |
| 3,741,159 | 6/1973 | Halaunbrenner | 119/4 |
| 4,170,197 | 10/1979 | Walker | 119/4 |
| 4,186,687 | 2/1980 | Gilpatric | 119/4 |
| 4,196,694 | 4/1980 | Buchanan | 119/3 |
| 4,231,322 | 11/1980 | Gilpatric | 119/4 |
| 4,328,764 | 5/1982 | Nickel | 119/4 |
| 4,377,987 | 3/1983 | Satre | 119/4 |
| 4,704,990 | 11/1987 | Moxham | 119/4 |
| 4,876,985 | 10/1989 | Marcum et al. | 119/4 |
| 4,896,626 | 1/1990 | Holt et al. | 119/4 |

FOREIGN PATENT DOCUMENTS

| | | | |
|---|---|---|---|
| 2420305 | 11/1979 | France | 119/4 |
| 2515481 | 5/1983 | France | 119/2 |
| 2590765 | 6/1987 | France | 119/2 |
| 2607358 | 6/1988 | France | 119/2 |

Primary Examiner—John G. Weiss
Attorney, Agent, or Firm—Frijouf, Rust & Pyle

[57] ABSTRACT

An improved apparatus and method is disclosed for the development of a marine habitat through the growth of mollusks. The improved apparatus and method comprises a plurality of retaining members with each of the plurality of retaining members having a mesh wall extending between a first and a second end. The plurality of retaining members are interconnected and the first and second ends are closed for retaining adult mollusks therein. The plurality of retaining members facilitate the development of a marine habitat concurrently with the growth of the mollusks when the plurality of retaining members are immersed in sea water.

17 Claims, 4 Drawing Sheets

APPARATUS AND METHOD FOR MARINE HABITAT DEVELOPMENT

BACKGROUND OF THE INVENTION

1. Field Of The Invention

This invention relates to an improved apparatus and method for developing a marine habitat. More particularly, the invention relates to an improved apparatus and method for developing a bed of mollusks in a marine habitat.

2. Information Disclosure Statement

The rapid growth in the population has brought massive dredging of costal water, canals and the creation of land by land fill projects. Prior to the advent of the Environmental Protection Agency, most dredging of costal water, canals as well as land fill projects were done with little regard for the environmental impact on marine life. Accordingly, the marine life in areas affected by dredging and land fill projects has heretofore been considered irreversibly changed by the process of dredging and/or land fill.

It has been well known in the art that mollusks may be artificially grown under the proper aquatic conditions. It has been also well known in the art that deep water artificial reefs can be established by the placing artificial material in the deep water to reestablish the natural biological processes of a marine reef.

U.S. Pat. No. 4,186,687 to Gilpatric issued Feb. 5, 1980 discloses a method in which cultchless young oysters of a selected size taken from seed stock are placed in a first set of foraminous cribs and the first set of foraminous cribs are then placed on a shelf within an open top receptacle where the young oysters are protectively housed within the receptacle intermediate the top and bottom of the receptacle. Immature oysters of a larger size than the oysters placed in the first set of cribs are placed in a second set of foraminous cribs and the second set of foraminous cribs are placed across the open top of the receptacle above the first set of cribs. The second set of cribs are lashed to the top of the receptacle, whereupon the receptacle with its oyster containing cribs supported thereon are lowered to the bottom of a body of water where it is allowed to remain for a predetermined oyster growth period. The receptacle and trays may be raised periodically for inspection, and for culling from the second set of cribs the mature oysters, and for culling from the first set of cribs immature oysters above a predetermined size which are then placed in the second set of cribs where they are allowed to reach maturity.

U.S. Pat. No. 4,377,987 to Satre issued Mar. 29, 1983 discloses a system for growing oysters comprising a vertical row of trays suspended from carrying ropes and enveloped by a protection net where each tray has a rim and bottom net for holding oysters. A system for releasably fastening the trays to the carrying ropes includes converging notches or indentations in the rim of each tray and an enlarged detent on each carrying rope for releasably engaging the notches or indentations.

U.S. Pat. No. 4,704,990 to Moxham Nov. 10, 1987 teaches a method and apparatus for cultivating mollusks particularly oysters. Oysters are placed in a water permeable container which is placed in suitable water to feed the oysters. The container is rotated so the oysters are regularly moved in the container. Rotation is caused by mechanical or tidal movement of the water.

U.S. Pat. No. 3,741,159 to Halaunbrenner issued June 26, 1973 discloses a float equipped cage for shell-fish comprising a basket like receptacle incorporating a float means and means for attaching a line at the bottom thereof.

U.S Pat. No. 3,316,881 to Fischer issued May 2, 1967 relates collecting and setting spat with an artificial cultch material formed from plastic foamed sheets of polyethylene suitably coated or uncoated for collecting and promoting the set of shell-fish spat thereon. Horizontal surfaces are spaced and superimposed for spat collection in predetermined predator protected positions until the spat is large enough to be selectively removed from the cultch for transplanting in oyster culture trays or the like.

U.S. Pat. No. 4,196,694 to Buchanan issued Apr. 8, 1980 teaches a method of construction of an artificial reef with individual reef elements manufactured from recycled or new materials. Each reef element is constructed from used tire casings which are cut in one of several different ways. One type of reef element is constructed by cutting a tire casing longitudinally along its tread area leaving a single small web area at one side short of the tire being completely severed into individual loop segments, or a pair of webs on opposite sides of the tread. Tire casings cut in this way are then fanned open and attached to one of two types of bases. The second and third types of reef elements are constructed from several side walls or half tires, also mounted on one of the two types of bases.

Although the aforementioned patents have promoted the development of marine life in deep water, the prior art did not consider the development of reefs, such as oyster beds in shallow water.

Therefore, it is an object of the present invention to provide an improved apparatus and method for the development of a marine habitat through the growth of mollusks adapted for promoting marine life in areas affected by dredging and land fill projects.

Another object of this invention is to provide an improved apparatus and method for the development of a marine habitat through the growth of mollusks for developing a reefs, such as an oyster bed in shallow water.

Another object of this invention is to provide an improved apparatus and method for the development of a marine habitat through the growth of mollusks using low cost, environmentally safe materials.

Another object of this invention is to provide an improved apparatus and method for the development of a marine habitat through the growth of mollusks wherein the reef material may be placed in position without special tools or special knowledge.

Another object of this invention is to provide an improved apparatus and method for the development of a marine habitat through the growth of mollusks including a plurality of retaining members for retaining oysters therein to develop an oyster bed.

Another object of this invention is to provide an improved apparatus and method for the development of a marine habitat through the growth of mollusks including a plurality of retaining members located adjacent to a sea wall for developing an oyster bed and for the natural reinforcement of the sea wall.

Another object of this invention is to provide an improved apparatus and method for the development of a marine habitat through the growth of mollusks including a plurality of retaining members formed from a rolled sheet of mesh polymeric material and a plurality of fastening means for interconnecting the sheets of mesh polymeric material.

Another object of this invention is to provide an improved apparatus and method for the development of littoral marine habitat through the growth of mollusks and red mangroves to provide waterfront home owners the ability of establishing functional "backyard" environmental restoration and educational project.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects and a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved apparatus for the development of a marine habitat through the growth of mollusks, comprising a plurality of retaining members with each of the plurality of retaining members having a mesh wall extending between a first and a second end. The mesh walls of each of the plurality of retaining members are selected for inhibiting the movement of adult mollusks therethrough and for simultaneously enabling the movement of smaller marine life therethrough. The plurality of retaining members are interconnected to form an array. The first and second ends of each of the plurality of retaining members are closed for retaining adult mollusks therein. The plurality of retaining members facilitate the movement of smaller marine life therethrough when the plurality of retaining members are immersed within water thereby developing a marine habitat concurrently with the growth of the mollusks.

In a more specific embodiment of the invention, each of the plurality of retaining members is substantially cylindrical and is made of a mesh polymeric material. In one embodiment of the invention, each of the plurality of substantially cylindrical retaining members is a rolled sheet of mesh polymeric material maintained in the rolled position by a plurality of fastening means. A plurality of fastening means may also be used for interconnecting the plurality of retaining members and for closing the first and second ends of each of the plurality of retaining members.

In one specific embodiment of the invention, the plurality of substantially cylindrical retaining members includes a central retaining member and a plurality of surrounding retaining members. Each of the plurality of surrounding retaining members is connected to the central retaining member. In addition, each of the surrounding retaining members is connected to adjacent surrounding retaining members. The combination of the central retaining member and the plurality of surrounding retaining members forms a multi-level array. A weight means may be disposed in at least one of the plurality of retaining members for fixing the plurality of retaining members to a sea floor.

The invention is also incorporated into the method of developing a marine habitat through the growth of mollusks, comprising the steps of forming a plurality of substantially cylindrical mesh retaining members with a mesh selected for inhibiting the movement of adult mollusks therethrough and for enabling the movement of smaller marine life therethrough. The plurality of retaining members are interconnected and the first end of each of the plurality of retaining members is closed. Adult mollusks are inserted within each of the plurality of retaining members and the second end of each of the plurality of retaining members are closed for retaining adult mollusks therein. The plurality of retaining members are immersed within sea water for developing a marine habitat concurrently with the growth of the mollusks.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several FIGS. of the drawings.

DETAILED DISCUSSION

Figure 1:
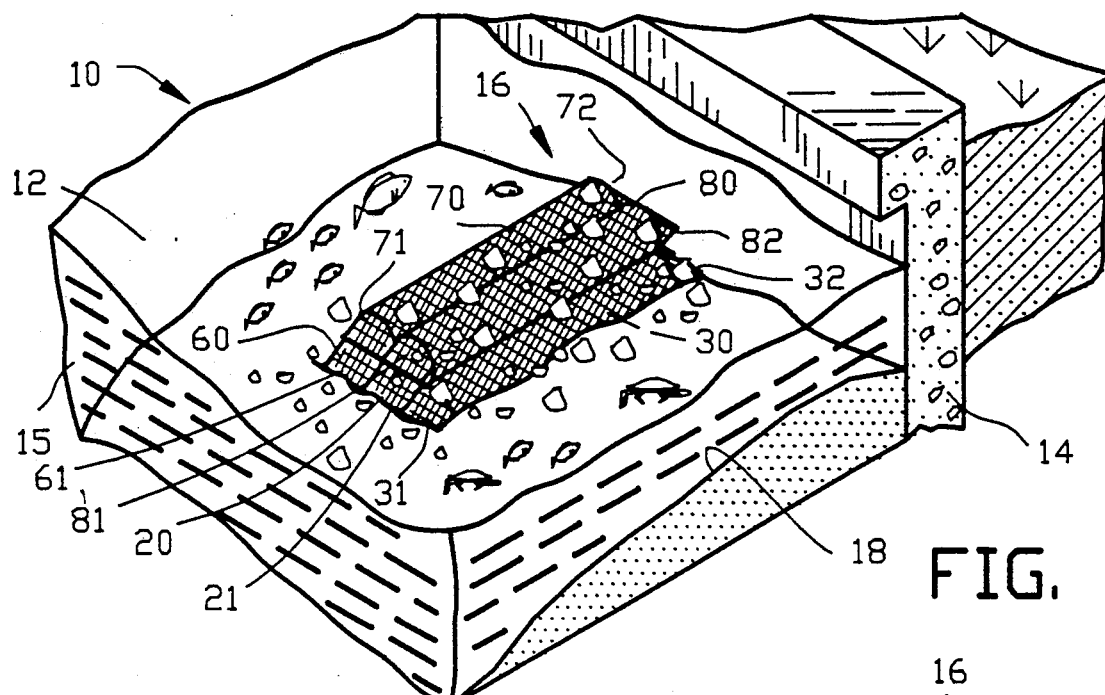
FIG. 1 is an isometric view partially in section of an improved apparatus for the developing a marine habitat located adjacent to a sea wall.

FIG. 1 is an isometric view partially in section of an improved apparatus 10 immersed within sea water 12 and located adjacent to a sea wall 14 for the developing a marine habitat. The improved apparatus 10 is shown positioned in a canal 15 of a coastal estuary. A costal estuary is a region where a tide of sea water meets a fresh water river current.

The improved apparatus 10 comprises an array 16 of a plurality of interconnected substantially cylindrical retaining members 20, 30, 40, 50, 60, 70 and 80. The plurality of retaining members 20, 30, 40, 50, 60, 70 and 80 extend between first ends 21, 31, 41, 51, 61, 71 and 81 and second ends 22, 32, 42, 52, 62, 72 and 82. The plurality of retaining members 20, 30, 40, 50, 60, 70 and 80 have mesh walls 23, 33, 43, 53, 63, 73 and 83 having mesh holes 24, 34, 44, 54, 64, 74 and 84. The mesh holes 24, 34, 44, 54, 64, 74 and 84 are selected to inhibit the movement of adult mollusks 17 therethrough, such as the oysters or the like. However, the mesh holes 24, 34, 44, 54, 64, 74 and 84 are selected to enable the movement of smaller marine life therethrough, such as larval-size oyster spats, small fish and crabs.

The first ends 21, 31, 41, 51, 61, 71 and 81 and the second ends 22, 32, 42, 52, 62, 72 and 82 are closed for retaining the adult mollusks 17 within the plurality of retaining member 20, 30, 40, 50, 60, 70 and 80 when the array 16 is disposed on the sea floor 18 as shown in FIG. 1.

The array 16 is positioned with the second ends 22, 32, 42, 52, 62, 72 and 82 adjacent to the sea wall 14 and with the first ends 21, 31, 41, 51, 61, 71 and 81 being positioned remote from the sea wall 14. Preferably, the array 16 extends perpendicularly from the sea wall 14 as shown in FIG. 1.

The improved apparatus 10 retains adult mollusks 7 within the plurality of retaining member 20, 30, 40, 50, 60, 70 and 80 to facilitate the growth of the mollusks 17 into a reef. Furthermore, mesh holes 24, 34, 44, 54, 64, 74 and 84 enable the movement of smaller marine life therethrough for developing a balanced marine habitat concurrently with the growth of the reef.

Figure 2:
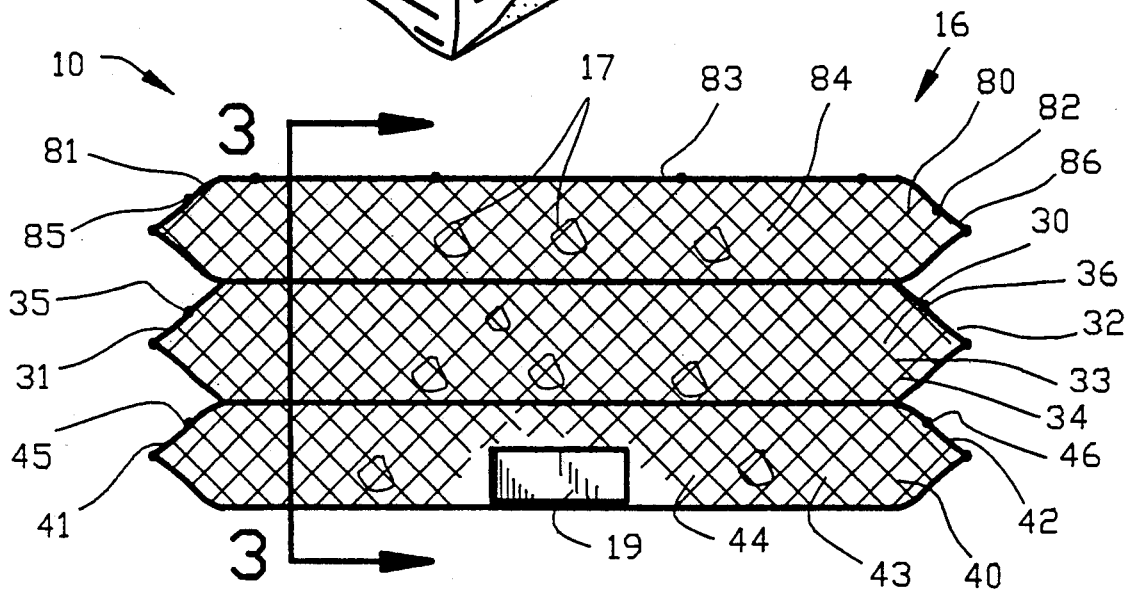
FIG. 2 is a side view of the apparatus of FIG. 1.

FIG. 2 illustrates the first ends 21, 31, 41, 51, 61, 71 and 81 being closed by first fasteners 25, 35, 45, 55, 65, 75 and 85 whereas the second ends 22, 32, 42, 52, 62, 72 and 82 are closed by second fasteners 26, 36, 46, 56, 66, 76 and 86. Preferably, the first fasteners 25, 35, 45, 55, 65, 75 and 85 and the second fasteners 26, 36, 46, 56, 66, 76 and 86 are made of an environmentally safe polymeric material. The apparatus 10 includes means for fixing the array 16 to the sea floor 18 shown as weight means 19 disposed in at least one of the plurality of retaining members 20, 30, 40, 50, 60, 70 and 80 for fixing the array 16 to a sea floor 18. Bricks or concrete blocks disposed within one or more of the plurality of retaining member 20, 30, 40, 50, 60, 70 and 80 may be used for the weight means 19.

Figure 3:
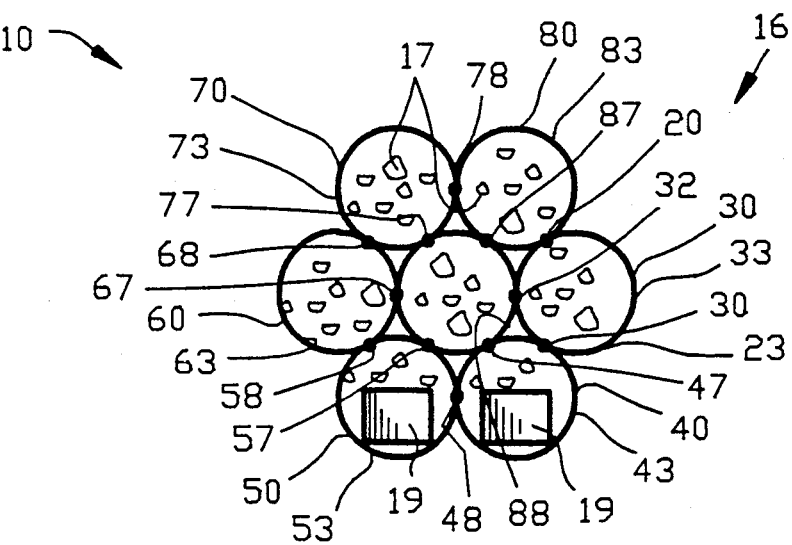
FIG. 3 is a sectional view along line 3—3 of FIG. 2.

FIG. 3 illustrates the plurality of retaining members 20, 30, 40, 50, 60, 70 and 80 interconnected to form the array 16. The array 16 comprises the central retaining member 20 and a plurality of surrounding retaining member 30, 40, 50, 60, 70 and 80. Each of the surrounding retaining member 30, 40, 50, 60, 70 and 80 are connected to the central retaining member 20 by central fasteners 37, 47, 57, 67, 77 and 87. In addition, each of the surrounding retaining member 30, 40, 50, 60, 70 and 80 is connected to adjacent surrounding retaining members by adjacent fasteners 38, 48, 58, 68, 78, and 88. Preferably, each of the plurality of the retaining members 20, 30, 40, 50, 60, 70 and 80 are four (4) feet in length.

Figure 4:
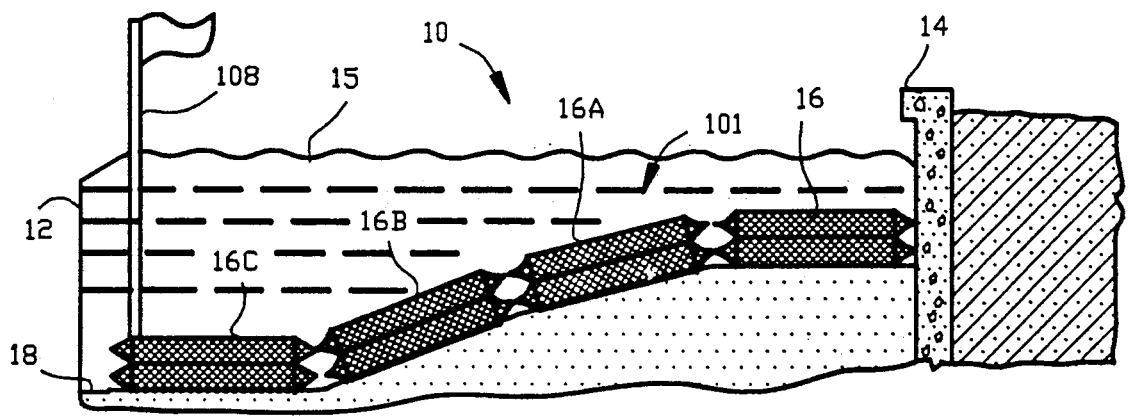
FIG. 4 is a sectional view of the improved apparatus located adjacent to a sea wall in a early stage of development and at high tide.
Figure 5:
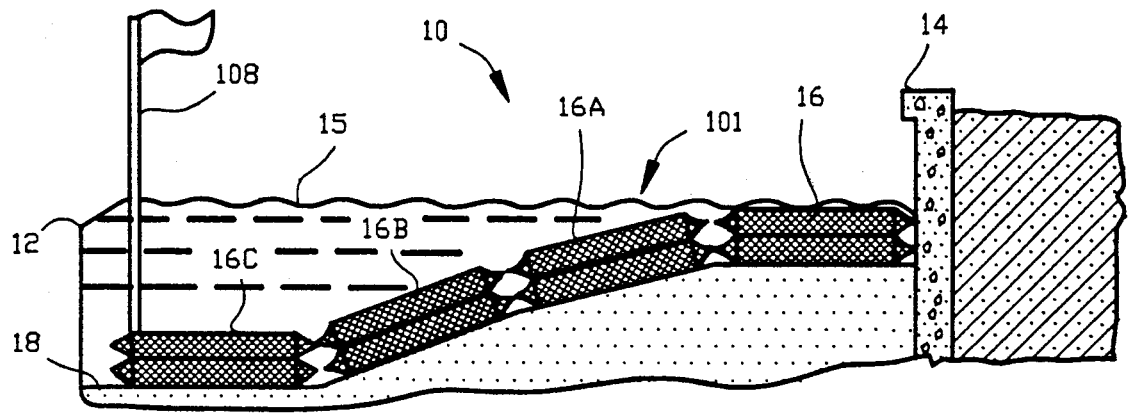
FIG. 5 is a sectional view of the improved apparatus located adjacent to the sea wall in a early stage of development and at low tide.

FIG. 4 is a sectional view of the improved apparatus 10 located adjacent to the sea wall 14 in a early stage of development and at high tide whereas FIG. 5 is a sectional view of the FIG. 4 at low tide. In this example, a plurality of arrays including arrays 16, 16A, 16B and 16C are established in an end-to-end relationship to form an array structure 101 extending from the sea wall 14. The array structure 101 shown in FIGS. 4-6 includes alternate means for fixing the array structure 101 to the sea floor 18. In this embodiment, a pipe 108 is forced down through the mesh holes of the array structure 101 into sea floor 18 below the array structure 101. The pipe 108 may also be used in combination with the weight 19 shown in FIGS. 2 and 3. The pipe 108 may also serves as a marker for the array structure 101.

Figure 6:
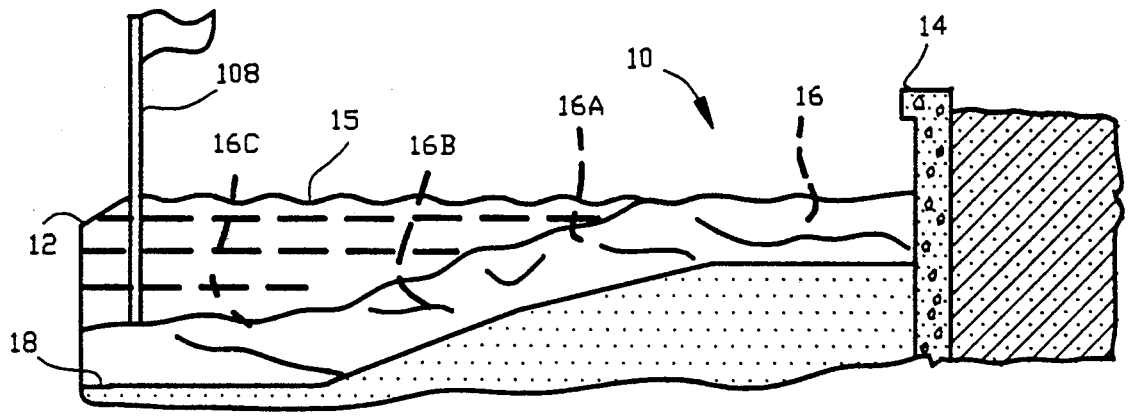
FIG. 6 is a sectional view of the improved apparatus located adjacent to the sea wall in a later stage of development and at low tide.

FIG. 6 is a sectional view of the improved apparatus of FIG. 4 in a later stage of development. The improved apparatus 10 creates a marine life habitat structure in dredged and filled canals of coastal estuaries. Oysters require brackish estuaries fed by fresh water tributaries. The mature oysters 17 that are retained within the arrays 16, 16A, 16B and 16C, provide a seeding reefs for oyster spat recruitment. The growth of larval-size spats to maturity oyster is very slow. In general, the salinity levels and nutrient from the fresh water tributaries will dictate rate of growth of the oysters 17. The polymeric retaining members 20, 30, 40, 50, 60, 70 and 80 attract barnacles, oysters, algae, bacteria, and detritus. The retained mature oysters 17 generate larvae which swim around for about two weeks looking for a structure for the larvae to attach. The improved apparatus 10 provides a permanent structure for attachment by the oyster spat. One square meter of oyster reef provides 50 square meters of available hard surface. The retaining members 20, 30, 40, 50, 60, 70 and 80 provides maximum habitat surface area with thousands of protected areas to attract oyster spat growth. It should be noted that oysters are sediment feeders and accordingly should never be eaten from canal areas or from artificial reefs due to possible presence of pollutants.

In some canals, the flow of fresh water is too much or too little causing only barnacle or algae growth. In these instances, the barnacles create the marine habitat. In situations where the retaining members 20, 30, 40, 50, 60, 70 and 80 never contain oysters or barnacles, other important food sources like algae are attracted to the arrays 16, 16A, 16B and 16C.

Figure 7:
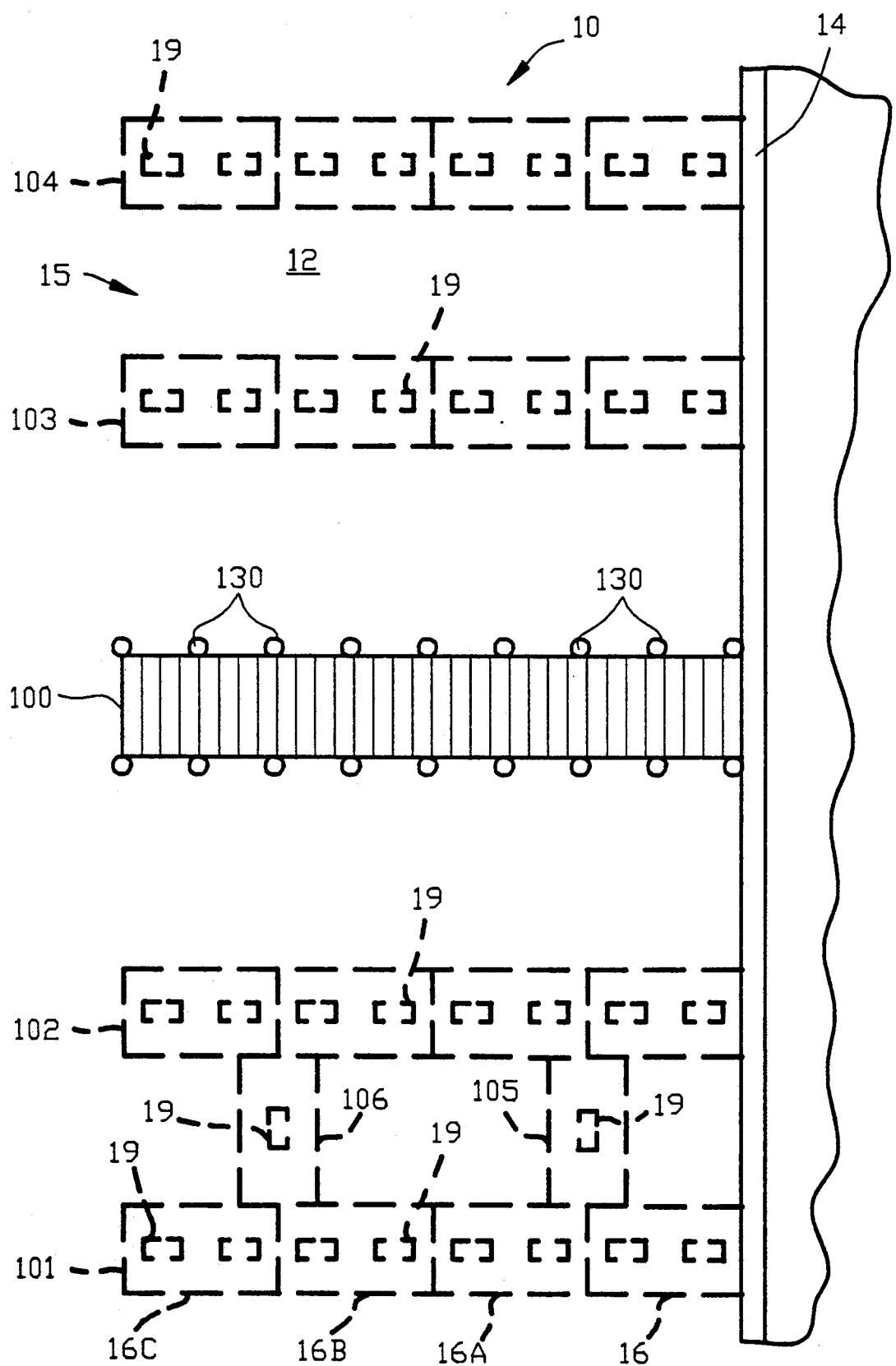
FIG. 7 is a plan view of a plurality of array structures of the improved apparatus positioned proximate a boat dock.

FIG. 7 is a plan view of a plurality of array structures 101, 102, 103 and 104 positioned proximate a boat dock 100. Preferably, each of the arrays 16, 16A, 16B and 16C are four (4) feet in length and are placed end-to-end to reach from the sea wall 12 to outer edge of dock 100. The arrays 16, 16A, 16B and 16C may be interconnected by fastening means to form the array structure 101.

The array structures 101, 102, 103 and 104 are placed on 8 foot centers along the sea wall 14 at right angles thereto. An array structure may also be placed under the docks 100. In some areas a cross array, such as cross-arrays 105 and 106 may be interconnected between adjacent array structures 101 and 102 by fasteners. Preferably, each of the cross-arrays 105 and 106 are weighted as heretofore described.

The improved apparatus 10 not only provides a maximum hard surface area for oysters, barnacles, algae, but also provides a marine habitat and shelter for a multitude of marine species such as small crabs and fish. Fish migration in estuaries is normally caused by different seasons, water temperature and salinity levels. Many species of juvenile and adult species of marine life can be observed between the protected spacings between adjacent the arrays structures 101, 102, 103 and 104.

Although the improved apparatus 10 was not specifically designed for high energy water current and wave action, the array structures 101, 102, 103 and 104 provide substantial protection and reinforcement for the sea wall 14. Furthermore, the oyster growth will cause silt and clay deposits around reefs to reduce wave action on the sea wall 14 as well as the boat dock 110.

If the array structures 101, 102, 103 and 104 are exposed or near surface of the sea water 12 at low tide, waterbirds are attracted to the array structures 101, 102, 103 and 104. Water birds feed on marine life such as small fish utilizing the reef for protection. Furthermore, red mangroves may grow in tropic zones by seeds propagating in the array structure 101.

Figure 8:
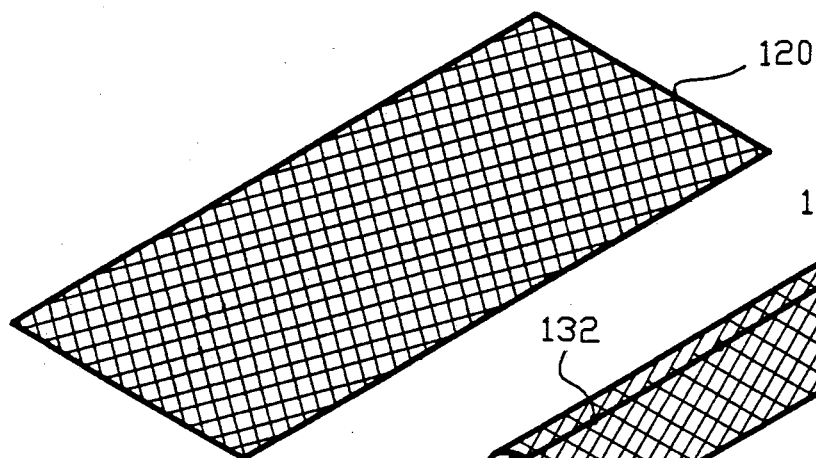
FIG. 8 is an isometric view of the first step in a method of developing a marine habitat illustrating a sheet of mesh material.

FIG. 8 is an isometric view of the first step in a method of developing a marine habitat illustrating a sheet 120 of polymeric mesh material. The sheet 120 of polymeric mesh material preferable has a generally parallelogram shaped mesh holes 24 having corner to corner dimensions of approximately 2.0 inches by 1.5 inches. The polymeric mesh material has a width of approximately 0.125 inches and a thickness of 0.0625 inches.

Preferably, the polymeric mesh material is made of high density polyethylene with a (3%) carbon black additive. High density polyethylene is used extensively in drinking water applications making all components biologically inert. High density polyethylene also provides a semi-rigid nature to the polymeric mesh material. The carbon black additive provides protection from ultraviolet light and retards the photo-oxidizing of the high density polyethylene material.

Figure 9:
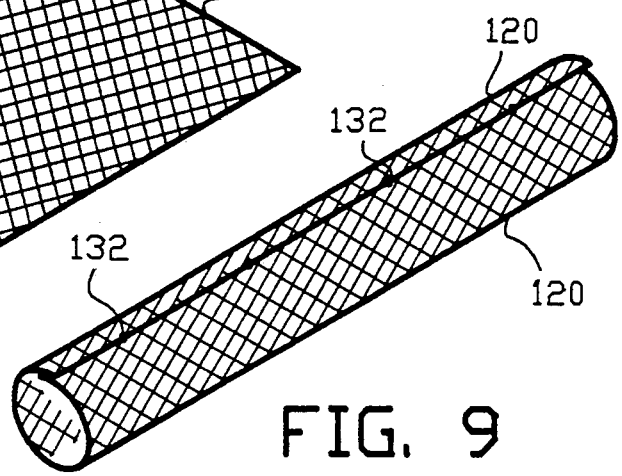
FIG. 9 is an isometric view of the second step in the method of developing a marine habitat illustrating the rolling of the sheet of mesh material into a retaining member.

FIG. 9 is an isometric view of the second step in the method illustrating the rolling of the sheet of mesh material into a retaining member 20. The sheet 120 of polymeric mesh fastening means 132. Although many types of fasteners may be used with the present invention, 15 gauge stainless steel one-half (0.5") inch diameter rings have been found to be suitable for use with the present invention. In the alternative, conventional self-fastening electrical wire wrap fasteners have also been found to be suitable for use with the present invention.

Figure 10:
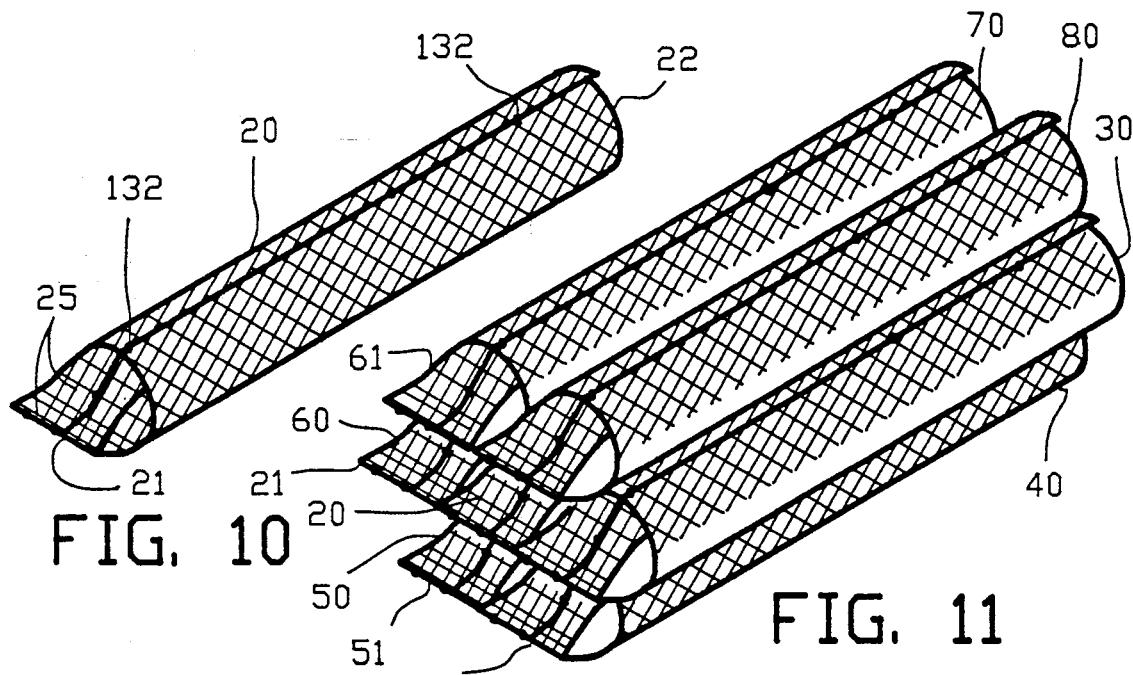
FIG. 10 is an isometric view of the third step in the method of developing a marine habitat illustrating the closing of a first end of the retaining member.

FIG. 10 is an isometric view of the third step in the method illustrating the closing of a first end 21 of the retaining member 20. The first end 21 of the retaining member 20 is maintained in the closed position by a plurality of first fastening means 25. The retaining members 30, 40, 50, 60, 70 and 80 are independently formed in a similar manner.

Figure 11:
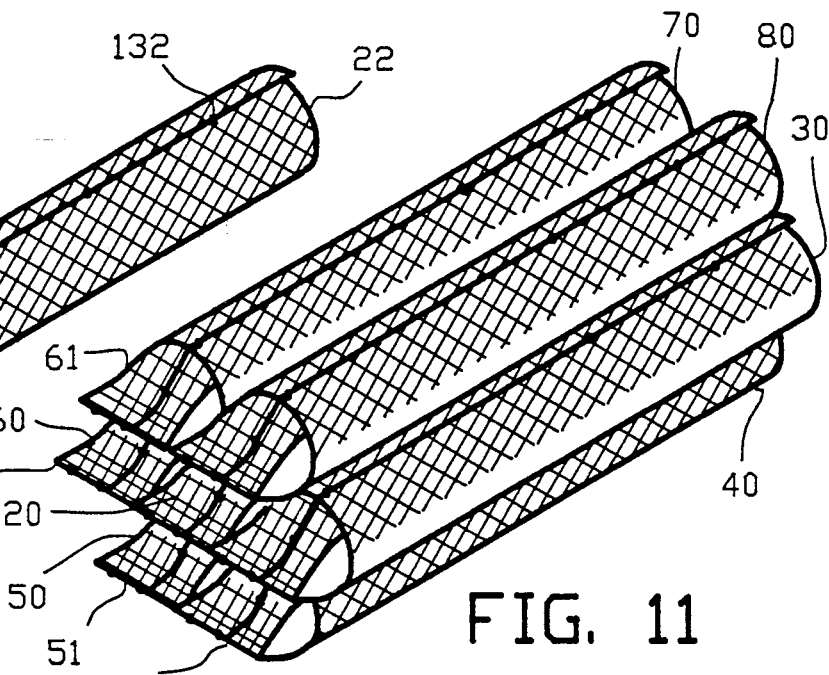
FIG. 11 is an isometric view of the fourth step in the method of developing a marine habitat illustrating the inter-connection of a plurality of the retaining members to form an array.

FIG. 11 is an isometric view of the fourth step in the method illustrating the interconnection of a plurality of the retaining members 20, 30, 40, 50, 60, 70 and 80 into an array. The plurality of the surrounding retaining members 30, 40, 50, 60, 70 and 80 are connected to the central retaining member 20 by a plurality of central fastening means 37, 47, 57, 67, 77 and 87 as shown in FIG. 3. Each of the surrounding retaining members 30, 40, 50, 60, 70 and 80 are connected to adjacent surrounding retaining members 30, 40, 50, 60, 70 and 80 by adjacent fasteners 38, 48, 58, 68, 78, and 88.

Figure 12:
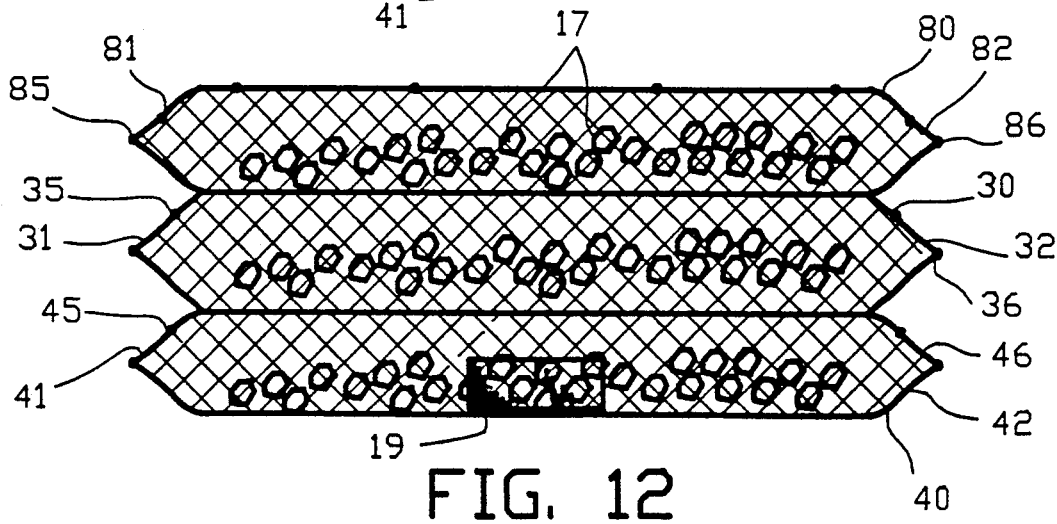
FIG. 12 is a side sectional view of the fifth step in the method of developing a marine habitat illustrating the insertion of adult mollusks within the plurality of the retaining members and the closing of a second end of each of the plurality of the retaining members.

FIG. 12 is a side sectional view of the fifth step in the method illustrating the insertion of adult mollusks 17 within the plurality of the retaining members 20, 30, 40, 50, 60, 70 and 70 and the closing of the second ends 22, 32, 42, 52, 62 and 72 by second fasteners 26, 36, 46, 56, 66, 76 and 86.

The plurality of retaining member 20, 30, 40, 50, 60 and 80 are immersed within the sea water. The proper positioning of the plurality of retaining member 20, 30, 40, 50, 60 and 80 within the sea water 12 may result in the accelerated growth of the marine habitat. The oysters 17 will feed or grow only when submerged in the sea water 12. Usually, the level where oysters or barnacles grow is the mid-point between the mean low tide and the mean high tide of the sea water 12. Since the depth of the sea water 12 may vary adjacent the sea wall 14, the array structures 101, 102, 103 and 104 may be first established in deeper sea water 14 until the array structures 101, 102, 103 and 104 recruit oyster spat or barnacles. The placement of the array structures 101, 102, 103 and 104 below the mean low tide mark will increase oyster and barnacle growth by two hundred percent (200%). Once the barnacle and oyster growth begins, the arrays 101, 102, 103 and 104 can be move closer to the sea wall 14 whereat the top portion of arrays structures 101, 102, 103 and 104 are positioned below the level where oysters or barnacles grow on the sea walls 14 and the piling 130 of the dock 100.

The improved apparatus 10 provides a biological landscape for waterfront properties. The number of marine life and wildlife increase according to the number of array structures 101, 102, 103 and 104 placed along waterfront property. The improved apparatus has demonstrated that most degraded coastal dredge and fill canals can be returned to a natural environment with a present invention. The present invention substantially improves the quality of life for marine species and provides a solution for restoring the wetlands to degraded costal regions.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved apparatus for the development of a marine habitat through the growth of mollusks, comprising:
   a plurality of generally cylindrical retaining members;

each of said plurality of retaining members having a mesh wall extending between a first and a second end;

said mesh wall of each of said plurality of generally cylindrical retaining members being selected for inhibiting the movement of adult mollusks therethrough and for simultaneously enabling the movement of smaller marine life therethrough;

a plurality of fastening means for interconnecting said plurality of generally cylindrical retaining members with a mesh wall of each said plurality of retaining members directly engaging with a mesh wall of an adjacent one of said plurality of retaining members;

each of said plurality of fastening means comprising a deformable element extending through adjacent mesh walls of adjacent retaining members for securing said adjacent retaining members into an array; and means for closing said first and second ends of each of said plurality of retaining members for retaining adult mollusks therein when said plurality of retaining members is immersed within water and for facilitating the movement of smaller marine life therethrough thereby developing a marine habitat concurrently with the growth of the mollusks.

2. An improved apparatus for the development of a marine habitat as set forth in claim 1, wherein each of said plurality of retaining members is made of a mesh polymeric material.

3. An improved apparatus for the development of a marine habitat as set forth in claim 1, wherein each of said plurality of retaining members is a substantially cylindrical roll of sheet of mesh polymeric material.

4. An improved apparatus of the development of a marine habitat as set forth in claim 1, wherein each of said plurality of retaining members is a substantially cylindrical roll of sheet mesh polymeric material; and a plurality of fastening means for maintaining each of said sheets of mesh polymeric material to be substantially cylindrical.

5. An improved apparatus for the development of a marine habitat as set forth in claim 1, wherein said means for closing said first and second ends of each of said plurality of retaining members includes a plurality of fastening means.

6. An improved apparatus for the development of a marine habitat as set forth in claim 1, wherein each of said plurality of retaining members is substantially cylindrical;

said plurality of retaining members include a central retaining member and a plurality of surrounding retaining members; and said means for interconnecting said plurality of retaining members includes each of said surrounding retaining members being connected to said central retaining member.

7. An improved apparatus for the development of a marine habitat as set forth in claim 1, including means for fixing said plurality of retaining members to a sea floor when said plurality of retaining members are immersed within sea water.

8. An improved apparatus for the development of a marine habitat as set forth in claim 1, including weight means disposed in at least one of said plurality of retaining members for fixing said plurality of retaining members to a sea floor when said plurality of retaining members are immersed within sea water.

9. An improved apparatus for the development of a marine habitat as set forth in claim 1, including a pole extending through at least one of said plurality of retaining members and extending into a sea floor for fixing said plurality of retaining members to the sea floor when said plurality of retaining members are immersed within sea water.

10. An improved apparatus for the development of a marine habitat through the growth of mollusks, comprising:

a plurality of generally cylindrical retaining members;

each of said plurality of retaining members having a mesh wall extending between a first and a second end;

said mesh wall of each of said plurality of generally cylindrical retaining members being selected for inhibiting the movement of adult mollusks therethrough and for simultaneously enabling the movement of smaller marine life therethrough;

a plurality of fastening means for interconnecting said plurality of generally cylindrical retaining members with a mesh wall of each of said plurality of retaining members directly engaging with a mesh wall of an adjacent one of said plurality of retaining members;

each of said plurality of fastening means comprising a deformable element extending through adjacent mesh walls of adjacent retaining members for securing said adjacent retaining members into an array;

means for closing said first and second ends of each of said plurality of retaining members for retaining adult mollusks therein when said plurality of retaining members is immersed within water and for facilitating the movement of smaller marine life therethrough thereby developing a marine habitat concurrently with the growth of the mollusks;

said plurality of retaining members including a central retaining member and a plurality of surrounding retaining members; and said plurality of fastening means interconnecting each of said surrounding retaining members to said central retaining member and interconnecting each of said surrounding retaining members to adjacent surrounding retaining members.

11. The method of developing of a marine habitat through the growth of mollusks, comprising the steps of:

forming a plurality of generally cylindrical mesh retaining members with a mesh selected for inhibiting the movement of adult mollusks therethrough and for enabling the movement of smaller marine life therethrough;

positioning the plurality of retaining members with the mesh of each of the plurality of retaining members directly engaging with the mesh of an adjacent one of the plurality of retaining members;

interconnecting the plurality of retaining members with a plurality of fastening means extending through the mesh of adjacent retaining members for securing the adjacent retaining members into an array;

closing a first end of each of the plurality of retaining members;

inserting adult mollusks within each of the plurality of retaining members;

closing for second end of each of the plurality of retaining members for retaining adult mollusks therein; and immersing the plurality of retaining members within water thereby developing a marine habitat concurrently with the growth of the mollusks.

12. The method of developing a marine habitat as set forth in claim 11, wherein the step of forming each of the plurality of generally cylindrical mesh retaining members includes rolling a sheet of mesh polymeric materials.

13. The method of developing a marine habitat as set forth in claim 11, wherein the step of interconnecting the plurality of retaining members includes interconnecting a first retaining member to a second retaining members and interconnecting the first and second retaining members to a third retaining member.

14. The method of developing a marine habitat as set forth in claim 11, wherein the step of interconnecting the plurality of retaining members includes interconnecting each of a plurality of surrounding retaining member to a central retaining member; and interconnecting each of the plurality of the surrounding retaining member to adjacent surrounding retaining members.

15. The method of developind a marine habitat as set forth in claim 11, including the step of inserting weight means into at least one of the plurality of retaining members for fixing the plurality of retaining members to a sea floor.

16. The method of developing a marine habitat as set forth in claim 11, including the step of inserting a pole through at least one of the plurality of retaining members to extend into a sea floor to fix the plurality of retaining members to the sea floor.

17. The method of developing a marine habitat as set forth in claim 11, wherein the step of closing the first and second ends of each of the plurality of retaining members includes closing the first and second ends with a plurality of fastening means.

* * * * *